(12) United States Patent
Stefani et al.

(10) Patent No.: US 9,828,178 B2
(45) Date of Patent: Nov. 28, 2017

(54) AUTOMATED WAREHOUSE WITH A LASER TARGETING SYSTEM

(71) Applicant: MODULA S.P.A. CON SOCIO UNICO, Fiorano Modenese (Modena) (IT)

(72) Inventors: Franco Stefani, Sassuolo (IT); Claudio Rettura, San Martino In Rio (IT)

(73) Assignee: MODULA S.P.A. CON SOCIO UNICO, Fiorano Modenese (IT)

( * ) Notice: Subject to any disclaimer, the term of this patent is extended or adjusted under 35 U.S.C. 154(b) by 0 days.

(21) Appl. No.: 15/311,256

(22) PCT Filed: Jun. 17, 2015

(86) PCT No.: PCT/IB2015/054566
§ 371 (c)(1),
(2) Date: Nov. 15, 2016

(87) PCT Pub. No.: WO2016/012877
PCT Pub. Date: Jan. 28, 2016

(65) Prior Publication Data
US 2017/0121112 A1    May 4, 2017

(30) Foreign Application Priority Data
Jul. 23, 2014    (IT) .............................. MO2014A0210

(51) Int. Cl.
*G06F 7/00*    (2006.01)
*B65G 1/137*    (2006.01)
*G01C 15/00*    (2006.01)

(52) U.S. Cl.
CPC ........... *B65G 1/137* (2013.01); *B65G 1/1371* (2013.01); *G01C 15/004* (2013.01); *B65G 2209/04* (2013.01)

(58) Field of Classification Search
USPC ........................................................ 700/214
See application file for complete search history.

(56) References Cited

U.S. PATENT DOCUMENTS 5,838,431 A    11/1998    Hara et al.
8,463,425 B2    6/2013    Hanel
(Continued)

FOREIGN PATENT DOCUMENTS

DE    102006031054 A1    1/2008

*Primary Examiner* — Kyle Logan
(74) *Attorney, Agent, or Firm* — Pearne & Gordon LLP (57) ABSTRACT

An automated warehouse (1) comprises a plurality of drawers (2), each drawer comprising a plurality of housing zones (3) each adapted to receive an item (A). The warehouse also comprises moving means configured for moving a drawer (2) between a rest position in which it is stored in a respective housing seat (5) and an access portion (6), and vice versa. The access portion (6) comprises a laser targeting system (8) configured to generate at least one point-like beam (9) and at least a linear beam (10) defining a localization track to locate an item or a housing zone in the drawer (2) disposed in the access portion (6). The automated warehouse (1) comprises a control unit operatively connected at least to the laser targeting system (8) and programmed for receiving information on at least one item to be taken/stored, and controlling the laser targeting system (8) so as to position the localization track according to the item to be taken/stored.

13 Claims, 6 Drawing Sheets

(56) References Cited

U.S. PATENT DOCUMENTS

2003/0123153 A1* 7/2003 Ohtomo ............... G01C 15/004
                                              359/618
2006/0038145 A1    2/2006 Itou
2009/0312864 A1* 12/2009 Hanel .................... B65G 1/137
                                              700/214

* cited by examiner

AUTOMATED WAREHOUSE WITH A LASER TARGETING SYSTEM

The invention relates to an automated warehouse.

The invention further has for an object a handling system of an automated warehouse.

The invention herein is particularly intended for an automated warehouse comprising a plurality of tray-shaped drawers of a substantially flat shape, and a shelf-shaped structure suitable for receiving said drawers stacked one above the other in one or more columns.

Each drawer is adapted to contain one or more items according to the size and type thereof. The term "item" is referred to small and medium-sized objects (e.g. machining tools).

Items having corresponding heights, are stored in the drawers, so that best use of the space therein available can be made.

As is known, automated warehouses exhibit at least one access portion, wherein the operator provides to take the item from the respective drawer, or to place the former into the respective drawer in order to store it inside the automated warehouse. The drawers are automatically moved by a control unit driving suitable moving means according to the item selected by the operator, said moving means being configured for bringing the respective drawer taken from the shelf-shaped structure into the access portion.

Two types of automated warehouses are particularly available which are defined according to the arrangement of the access portion relative to the shelf-shaped structure constituting the automated warehouse itself.

In the first type of warehouse, named "inner bay" automated warehouse, the access portion is defined by an opening which is obtained within the support structure of said warehouse, within which the selected drawer is positioned. In a warehouse of the kind above described, the drawer remains within the volumetric encumbrance of the warehouse support structure and the operator gains access thereto through said opening.

In the second type of warehouse, called "outer bay" automated warehouse, the access portion is defined outside of the support structure of aforementioned warehouse, and it generally forms a horizontal portion protruding with respect to the vertical portion of the support structure wherein the drawers are housed. In this kind of warehouses, the drawer projects out from the volumetric encumbrance of the warehouse support structure, and the operator gains access to it through an opening arranged in the above mentioned access portion.

In both types of warehouses, it is particularly felt the need to optimize all the phases of the process involving taking and storage of items.

For this purpose, the Applicant has found that the most sensitive step of the process of taking and storing items, involves locating the item to be taken from the drawer being arranged in the access portion, or the zone wherein said drawer is housed, in which zone the item to be stored shall be positioned. In particular, the Applicant has found that optimization of the entire process of taking/storing items, implies balancing of opposed factors including identification time, identification accuracy as well as warehouse costs to be meant as fixed costs, and management costs.

In order to optimize the above factors in the best suited manner, the Applicant therefore concluded that there is a need to start from structurally simple solutions to be combined with effective identification systems enabling immediate and accurate location of the item and/or of the housing zone, throughout the whole extension of the drawer, which sometimes can be a quite high degree extension.

In this context, the technical task of the invention herein, is to provide an automated warehouse and handling system thereof, which allow to meet the requirements indicated above.

In particular, it is an object of the present invention to provide an automated warehouse and handling system thereof, which is able to optimize the time it takes for the items to be taken/stored, as well as optimize fixed and management costs in relation to the warehouse, obtaining at the same time a more accurate taking/storage of the items.

A further object of the present invention is to provide an effective and safe automated warehouse.

The technical task mentioned and the aims specified are substantially attained by an automated warehouse and handling system thereof, comprising the technical characteristics described in one or more of the appended claims. The dependent claims correspond to different embodiments of the invention.

Further characteristics and advantages of the present invention will become more apparent from the indicative, and therefore non-limiting, description of a preferred but non-exclusive embodiment of an automated warehouse, as illustrated in the accompanying drawings in which.

Referring to the figures, by 1 it is indicated an automated warehouse in its entirety. The warehouse illustrated in the attached figures is of the "inner bay" type. Alternatively the present invention may relate to an "external bay" warehouse though not explicitly illustrated.

The automated warehouse 1 comprises a plurality of drawers 2. Each drawer is for example tray-shaped and essentially flat.

Figure 2:
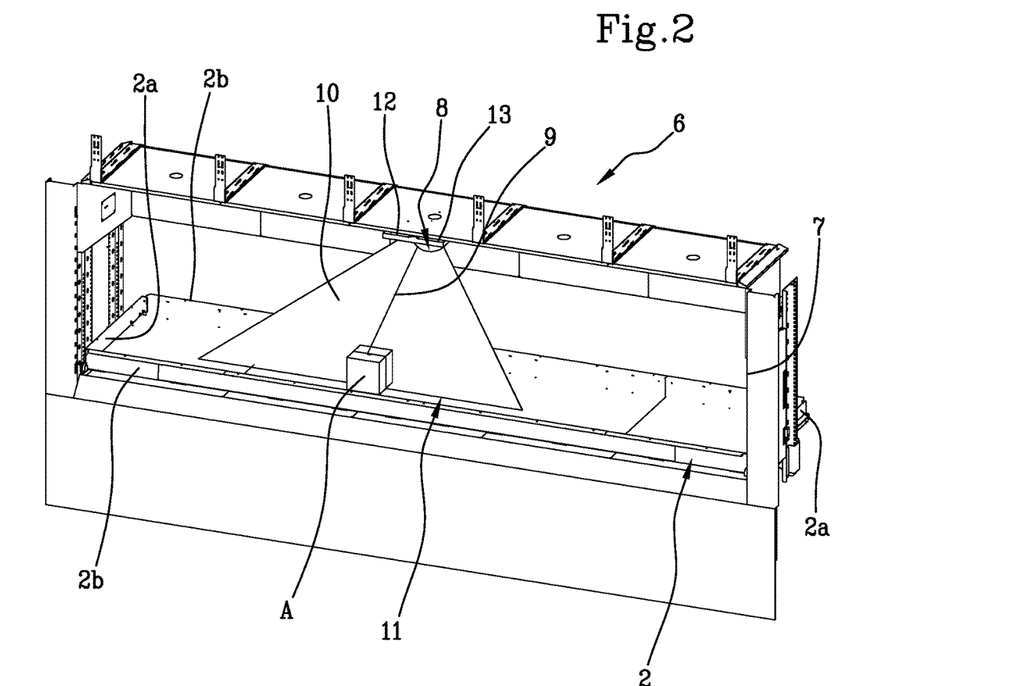
FIG. 2 is a schematic enlarged perspective view of a portion of the automated warehouse of FIG. 1.
Figure 4:
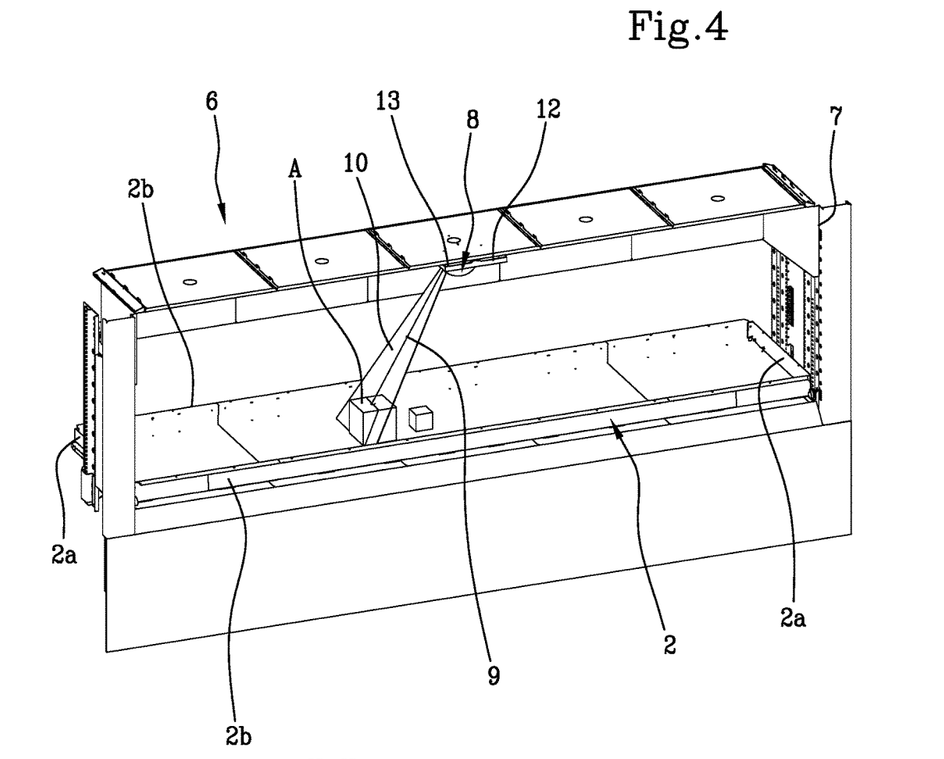
FIG. 4 is a schematic enlarged perspective view of a portion of the automated warehouse of FIG. 3.

According to a possible embodiment, a drawer 2 can exhibit a quadrangular perimeter in plan view, which quadrangular perimeter is preferably rectangular, defined by two short sides 2*a* and two long sides 2*b* (FIG. 2 and FIG. 4). The sizes of the drawers 2 may vary depending on the type of warehouse and items to be stored. In some cases, the width of the drawers (short side 2*a*) can extend up to 800 cm and the length thereof (long side 2*b*) can reach 4 m.

Each drawer 2 comprises a plurality of housing zones 3. Each housing zone 3 is adapted to receive an item A.

Preferably each drawer 2 has an open conformation, i.e. it enables direct access for the purposes of taking/storing the items. In a possible embodiment of the drawers 2, not shown, there may be provided subdivisions and/or compartments preferably open, each of which corresponding to a housing zone 3.

Figure 1:
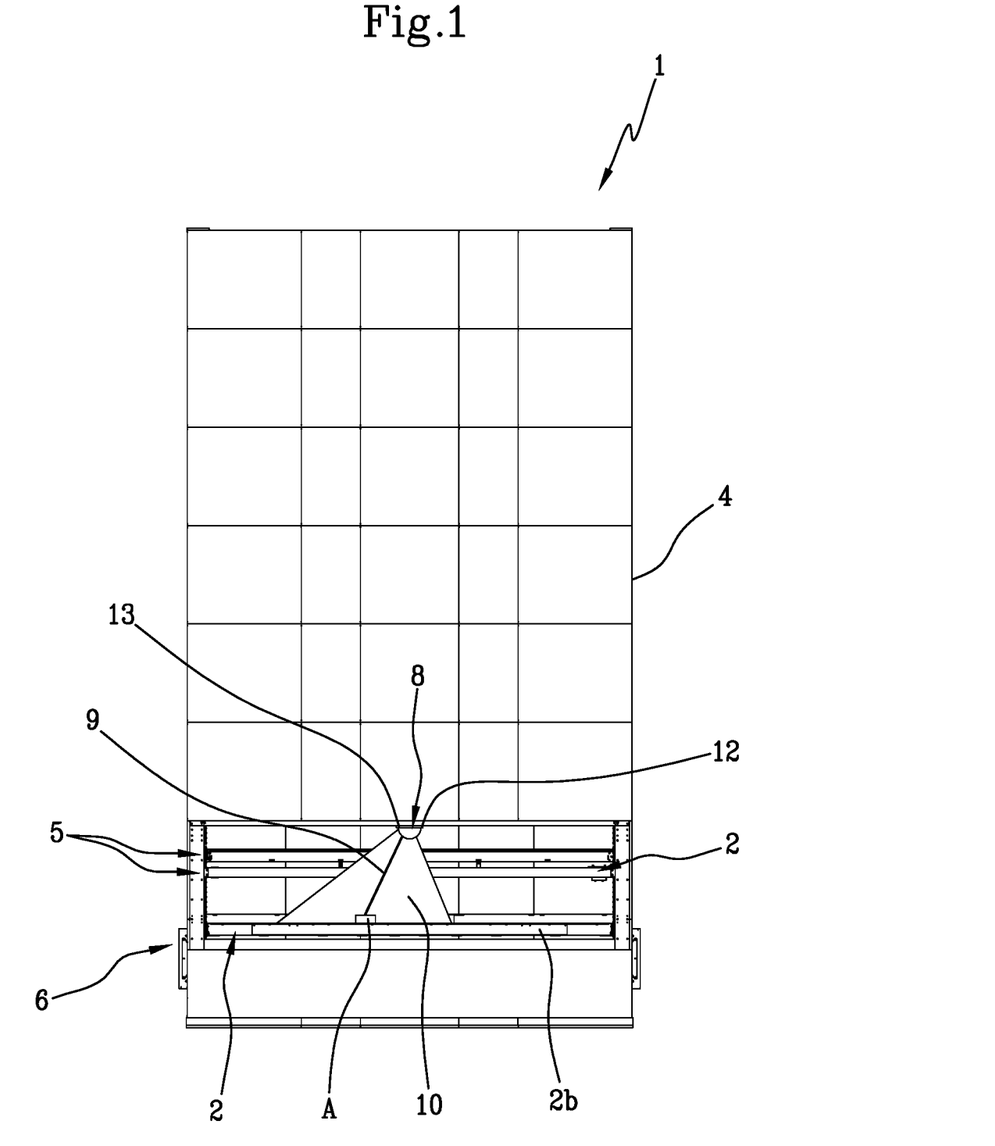
FIG. 1 is a schematic front view of an automated warehouse according to a first embodiment of the present invention.
Figure 3:
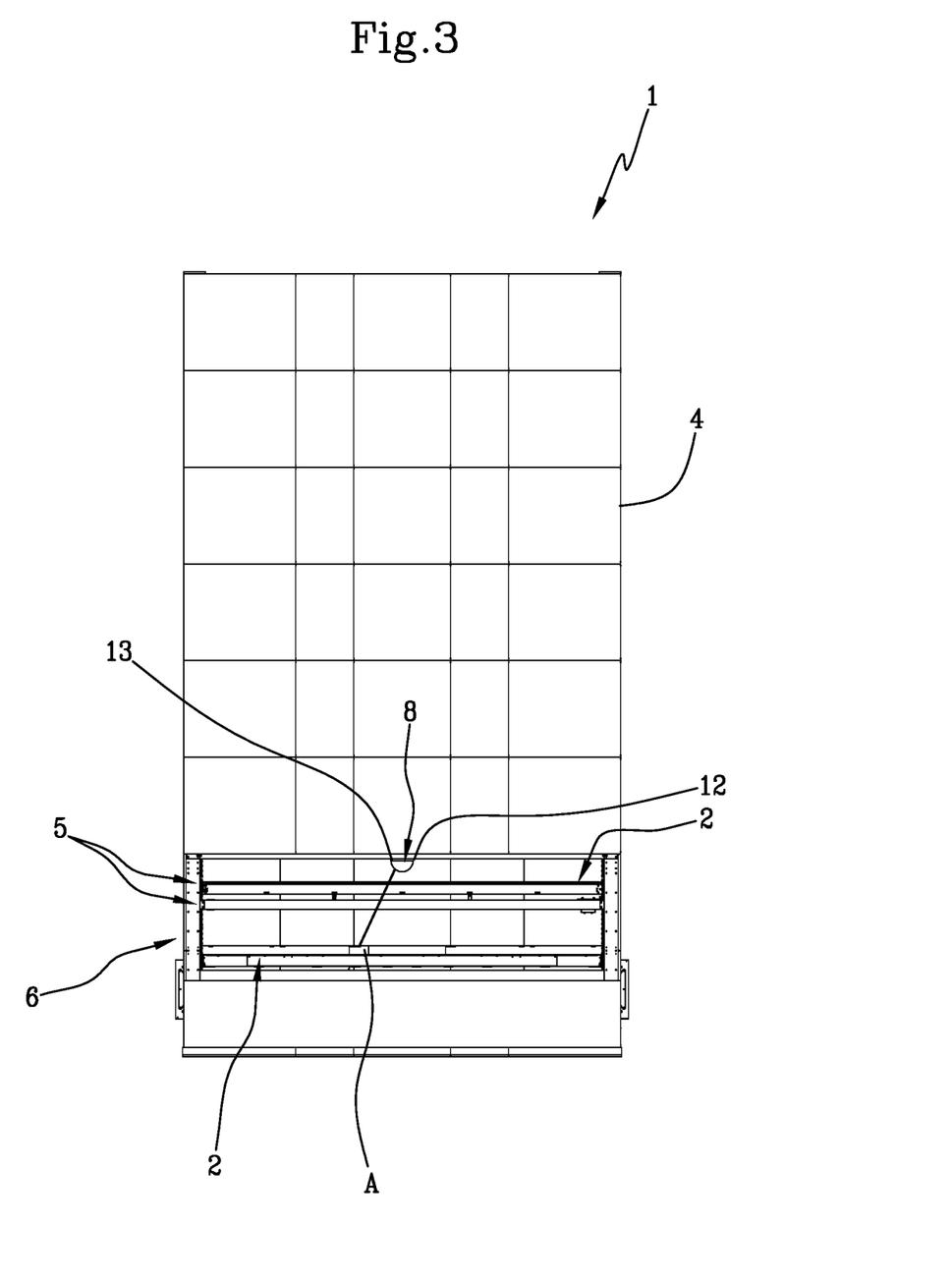
FIG. 3 is a schematic front view of an automated warehouse according to a second embodiment of the present invention.

By 4 it was indicated a support structure of the warehouse which defines a shelf-shaped support structure (see FIG. 1 and FIG. 3).

The support structure 4 comprises a plurality of housing seats 5. Each housing seat is configured for receiving a drawer 2.

Preferably, the support structure 4 and the arrangement of the housing seats 5 allow to stack the drawers 2 in one or more columns. For example the support structure 4 has a parallelepiped shape and includes a series of housing seats 5 arranged one above the other along one or more vertical columns. The housing seats 5 predisposed for containing the respective drawers 2, enable a stacked arrangement of said drawers 2. According to the embodiment of FIG. 1 and FIG. 3, the support structure 4 and the arrangement of the housing seats 5 allow to stack the drawers 2 in two vertical columns.

A drawer is in the rest position thereof, when it is stored inside a respective housing seat 5 of the support structure 4. The items arranged inside a drawer in its rest position, are detectable by the coordinates of the drawer 2 relative to the support structure 4 and the respective housing zone 3 with respect to the drawer 2.

The automated warehouse 1 comprises at least one access portion 6 configured for receiving at least one drawer 2 and allowing to take and/or to store one or more items from and/or into said drawer located within the access portion 6. Preferably the access portion 6 develops relative to a base of the support structure 4. FIG. 2 and FIG. 4 correspond to an enlarged view of respective access portion 6.

The access portion 6 is operatively associated with the support structure 4. In other words, the access portion is structurally and functionally associated with the support structure 4 for receiving the drawer 2 coming from the housing seats 5. When a drawer is recalled relative to the access portion, said drawer is in an access position wherein an item can be taken from a housing zone 3 or positioned within a housing zone 3.

With reference to the so-called "inner bay" warehouses, as in the illustrated example, the access portion 6 is formed within a portion disposed inside the support structure 4. With reference to the so-called "outer bay" warehouses, not illustrated, the access portion 6 is instead arranged at a portion which is external to the support structure 4.

The access portion 6 comprises at least one access opening 7 through which an operator may take and/or store one or more items from and/or into the drawer disposed in the access portion 6 (FIG. 2 and FIG. 4). In the case of drawers exhibiting a rectangular perimeter in plan view, the access portion 6 is preferably configured for receiving a drawer arranged with long sides 2b thereof parallel to the access opening 7, as illustrated by way of example in the attached figures. According to an alternative embodiment not shown, the access portion 6 may be configured to receive a drawer arranged with shorter sides thereof parallel to the second access opening 7.

Moving means (only partially visible in FIGS. 1 and 3), are associated to the support structure 4 and the access portion 6, and are configured for shifting a drawer between its rest position and the access position and vice versa. The moving means are not described nor illustrated in detail as they can be of the known type. Preferably said moving means are controlled by a programmable control unit (not shown) and manageable by a user, hence, when it is requested to take/store a certain item, the moving means provide to take relevant drawer 2 and to position it at the access portion 6. Advantageously, the access portion 6 comprises a laser targeting system 8 configured for generating at least one point-like beam 9 and at least one linear beam 10, which point-like beam 9 and linear beam 10 define a localisation track 11, in order to locate an item A or a housing zone 3 within the drawer 2, which drawer 2 is arranged within the access portion 6.

Advantageously, the automated warehouse comprises a control unit which is operatively connected at least to the laser targeting system 8 and programmed for receiving information on at least one item A to be taken, and/or stored, and for controlling the laser targeting system 8 in order to position the localisation track 11 according to the item to be taken/stored. Preferably a single control unit, for example comprising one or more control modules, is operatively connected to the laser targeting system and to the moving means for taking the drawer 2 comprising the item A, or the selected housing zone 3; the control unit further bringing said drawer relative to the access portion 6 and positioning the localisation track 11 according to the item to be taken/stored.

Preferably, the laser targeting system 8 is configured for generating a linear beam 10, exhibiting an L shape and/or an L length and/or a position which is pre-defined relative to the point-like beam 9. In particular, the laser targeting system 8 can be configured for generating a linear beam 10 passing through the point-like beam 9.

Still more particularly, the laser targeting system 8 can be configured for generating a point-like beam 9 arranged in the center line of the linear beam 9. In this case the linear beam 10 can have a pre-defined length L preferably between 400 mm and 4 m and must be moved in two directions so as to cover the whole extension of the drawer 2.

With reference to the examples illustrated, the linear beam 10 is preferably a rectilinear beam.

According to a possible embodiment, each drawer 2 exhibits a quadrangular perimeter in plan view and the laser targeting system 8 is configured for generating a rectilinear beam extending parallel to a side of the drawer 2, disposed in the access portion 6.

Figure 2A:
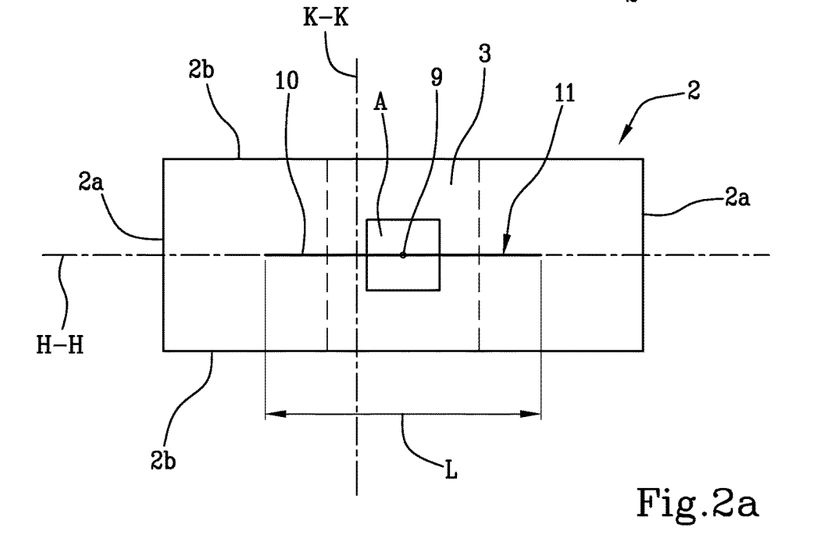
FIG. 2A is a schematic plan view of a detail of the automated warehouse of FIG. 1.
Figure 4A:
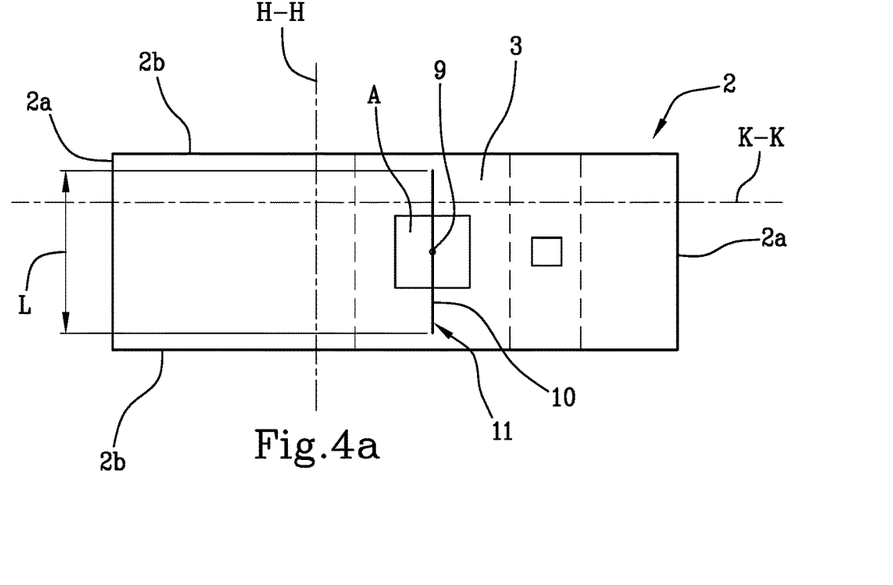
FIG. 4A is a schematic plan view of a detail of the automated warehouse of FIG. 3.
Figure 5:
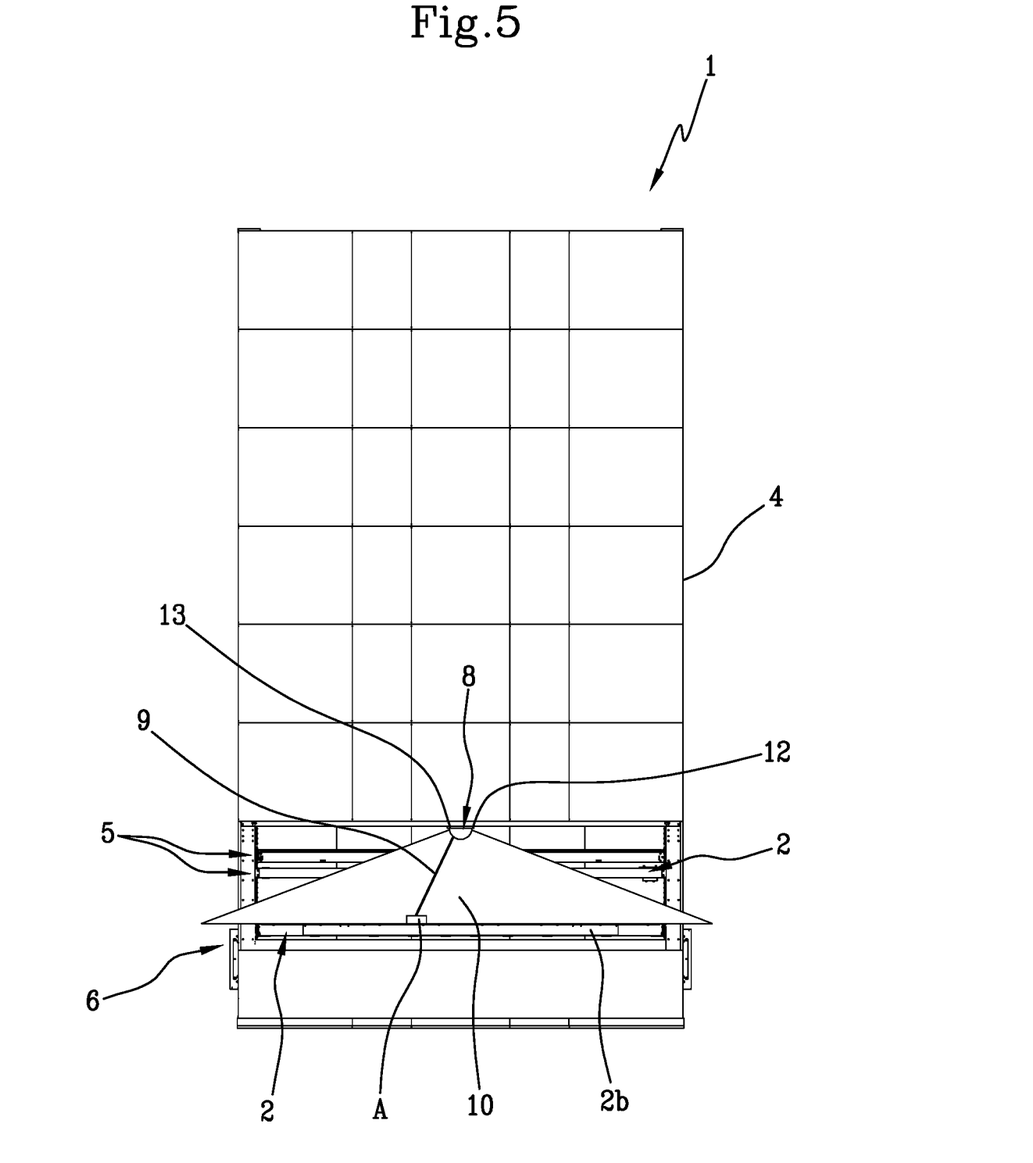
FIG. 5 is a schematic front view of an automated warehouse according to a third embodiment of the present invention.
Figure 5A:
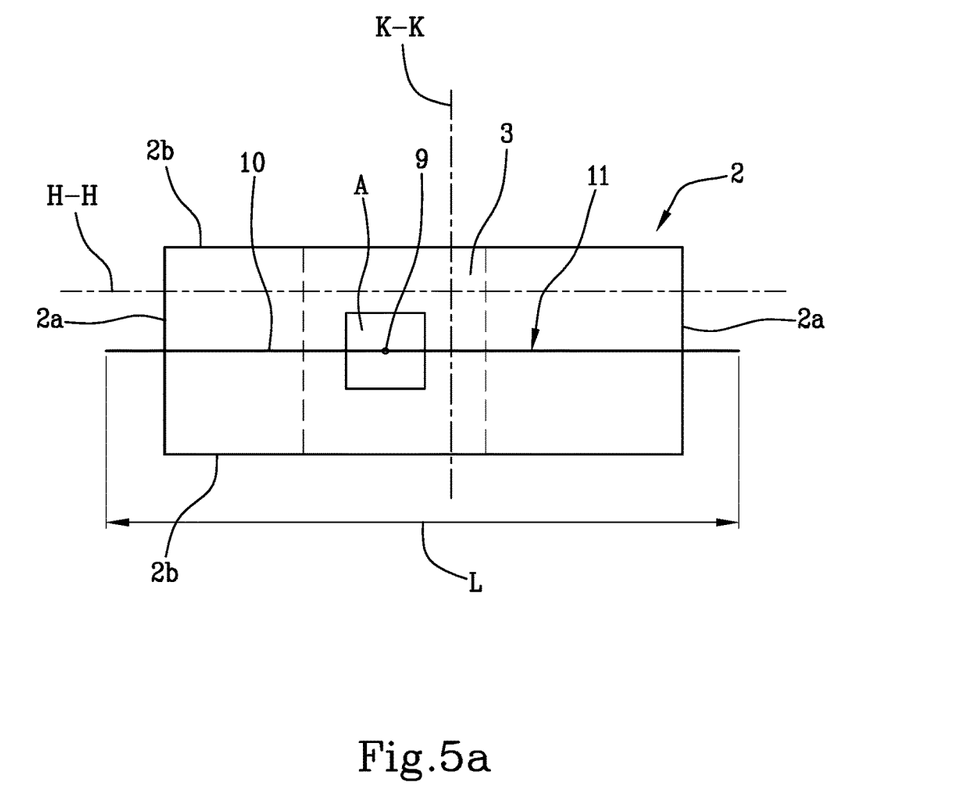
FIG. 5A is a schematic plan view of a detail of FIG. 5.

In particular, with reference to the embodiment illustrated in FIGS. 3, 4 and 4A, each drawer 2 exhibits a rectangular perimeter in plan view and the laser targeting system 8 is configured for generating a rectilinear beam extending parallel to a short side 2a of the drawer 2 arranged in the access portion 6. Alternatively, with reference to the embodiment illustrated in FIGS. 1, 2, 2A, each drawer 2 exhibits a rectangular perimeter in plan view and the laser targeting system 8 is configured to generate a rectilinear beam extending parallel to a long side 2b of the drawer 2 disposed in the access portion 6.

The laser targeting system 8 can be generally configured for creating a beam 10 with a linear length less than a size of the extension area in plan view of a drawer 2. Preferably, the laser targeting system 8 is configured for generating a rectilinear beam having a length L which is shorter than the respective side of the drawer 2 disposed within the access portion 6 relative to which the rectilinear beam is parallel. In this case the drawer must be moved both in the direction of the beam and in the one which is orthogonal to the latter, so as to cover the drawer in all the positions thereof.

In other words, the laser targeting system 8 comprises first motor means 12 able to allow movement of the linear beam 10 and/or point-like beam 9 in a direction orthogonal to the linear beam 10 KK.

Said laser targeting system 8 comprises second motor means 13 suitable for enabling movement of the linear beam 10 and/or point-like beam in a direction parallel to the linear beam 10 HH.

Alternatively, the laser targeting system 8 can be configured for generating a beam 10 having a linear length greater than a size of the extension area in plan view of a drawer 2. Preferably, the laser targeting system 8 is configured for creating a rectilinear beam having a length L greater than the respective side of the drawer 2 disposed in the access portion 6 with respect to which the rectilinear beam is parallel. In this case, in order to cover all the positions of the drawer, the rectilinear beam can be moved only in the direction orthogonal to the one of the beam, with consequent simplification of the laser targeting device 8.

In other words, in this second embodiment, the laser targeting system 8 comprises first motor means 12 able to allow movement of the linear beam 10 and/or point-like beam 9 in a direction orthogonal to the linear beam 10 K-K.

Furthermore, in this second embodiment, the second motor means 13 are suitable for allowing the movement of the point-like beam 9 in a direction parallel to the H-H linear beam 10. Said H-H direction coinciding with the one subtended by the linear beam.

According to a possible embodiment, the control unit can be programmed to control the laser targeting system 8, so as to modify the shape and/or length and/or position of the linear beam 10 relative to the point-like beam 9 according to the item A to be taken/stored. Alternatively or in addition, the control unit can be programmed to control the laser targeting system 8 so as to change orientation of the linear beam 10 relative to the drawer 2 arranged in the access portion 6 according to the item A to be taken/stored.

According to a further aspect, the present invention relates to a handling system of an automated warehouse 1, for example made according to one or more of the embodiments described hereinabove.

The handling system comprises:
- setting, within the control unit, the information relating to at least one item A to be taken/stored;
- shifting the drawer 2 associated to said information from the rest position to the access position thereof;
- generating/placing at least one point-like beam 9 and at least one linear beam 10 defining a localisation track 11 to locate the item A or the corresponding housing zone 3 in the drawer 2, which drawer 2 is placed in the access portion 6;
- taking/storing said item A relative to the localisation track 11.

According to a possible embodiment, the laser targeting system 8 can be controlled so as to change the shape and/or length and/or position of the linear beam 10 relative to the point-like beam 9 according to the item A to be taken/stored.

According to a possible further embodiment, the laser targeting system 8 can be controlled so as to change orientation of the linear beam 10 relative to the drawer 2 disposed in the access portion 6 in function of the item A to be taken/stored.

The laser targeting system 8 can be controlled in such a way that the point-like beam is fixed during the taking phase of the item and pulsating during the storing phase thereof.

The above aims are attained by the invention herein, owing to the presence of a laser targeting system configured for generating at least one point-like beam and at least one linear beam defining a localisation track in order to identify an item or a housing zone in the drawer disposed in the access portion.

Co-operation between a point-like beam and a linear beam allows immediate identification of the selected item or selected housing zone. Particularly, a point-like beam generated on purpose, allows to optimize identification of the item and to properly mark any item/housing zone, even if arranged laterally with respect to the laser targeting system, while the creation of a linear beam allows to better locate the drawer zone which is of interest to the operator, leading him/her to promptly look toward it.

Owing to the presence of a control unit operatively connected at least to the laser targeting system, it is possible to automate the processing steps of the information on the item A to be taken/stored, as well as the control steps of the laser targeting system, so that the localisation track can be positioned according to the item to be taken/stored.

In this manner, identification timing are compatible with the requirements and the operation mode of the automated warehouse. In addition providing a laser targeting system configured for generating at least one point-like beam and at least one linear beam, does not excessively affect the fixed costs and/or the costs relating to the warehouse management.

In particular, the laser targeting system offers remarkable versatility as it can be configured for generating a beam exhibiting a pre-defined linear shape and/or length and/or position with respect to the point-like beam. Such versatility fits with different types of items/housing zones, it follows that both the operator's addressing as well as correct identification and marking of the item are optimized.

It appears particularly advantageous to provide a laser targeting system configured for creating a linear beam crossing the point-like beam. In this way the synergistic co-operation between the two beams is even more highlighted, since the linear beam makes it even more immediate identification of the point-like beam, and thus of the item/housing zone.

In particular, owing to the fact that the point-like beam is predisposed in the center line of the linear beam, a symmetrical localisation track which facilitates the identification phase can be defined.

Further, use of a rectilinear beam enables to utilize a simple and reliable laser targeting system and to generate an effective portion indicator of the drawer of interest to the operator.

By generating a rectilinear beam which is parallel to one side of the drawer, the identification phase is proved to be more intuitive and not influenced by arrangement of the items within the drawer. In this case, the laser targeting system can be simplified by adopting a length of the beam greater than that of the drawer side to which the beam is parallel. The rectilinear beam and the point-like beam can be moved in the orthogonal direction with respect to that of the rectilinear beam via a first motor, whereas by means of a second motor, the point-like beam can be moved along the rectilinear beam. In this way a Cartesian mapping of the drawer can be obtained, i.e. the rectilinear beam locates the position of the taking/storing zone of the item along the first axis, while the point-like beam locates the position of the taking/storing zone of the item along the second axis.

Particularly, the identification phase is less affected by the fact that the items have a different height where a rectilinear beam is generated which is disposed parallel to a short side of the drawer (width).

The warehouse according to the invention herein, can be adapted according to specific needs which may provide for example the change of shape and/or length and/or position of the linear beam relative to the point-like beam according to the item to be taken/stored; provided can also be the change of orientation of the linear beam relative to the drawer arranged in function of the item to be taken/stored.

The invention claimed is:

1. An automated warehouse (1) comprising:
   a plurality of drawers (2), each drawer comprising a plurality of housing zones (3) each adapted to receive an item (A);
   a support structure (4) comprising a plurality of housing seats (5), each of said housing seats being configured to receive a drawer (2);
   at least one access portion (6) operatively associated with said support structure (4), said access portion being configured to receive at least one drawer (2) and to allow one or more items to be taken and/or stored from and/or in said drawer arranged in the access portion (6);
   moving means associated with said support structure (4) and with said access portion (6), said moving means being configured to move a drawer (2) between a rest position wherein it is stored in a respective housing seat (5) of the support structure (4) and an access position wherein it is arranged in the access portion (6) and vice versa;
   characterised in that said access portion (6) comprises a laser targeting system (8) configured to generate at least one point-like beam (9) and at least one linear beam (10) defining a localisation track (11) to identify an item or a housing zone in the drawer (2) arranged in the access portion (6),
   and in that said automated warehouse (1) comprises a control unit operatively connected to at least said laser targeting system (8) and programmed to receive information on at least one item to be taken/stored and to control said laser targeting system (8) to position said localisation track (11) according to the item to be taken/stored,
   wherein said linear beam (10) is a rectilinear beam and wherein each drawer (2) has a quadrangular perimeter plan and wherein said laser targeting system (8) is configured to generate a rectilinear beam extending parallel to one side of the drawer (2) arranged in the access portion (6).

2. An automated warehouse (1) according to claim 1, wherein said control unit is programmed to control said laser targeting system (8) so as to modify the conformation and/or length and/or position of said linear beam (10) with respect to said point-like beam (9) according to the item (A) to be taken/stored.

3. An automated warehouse (1) according to claim 1, wherein said control unit is programmed to control said laser targeting system (8) so as to modify the orientation of said linear beam (10) with respect to the drawer (2) arranged in the access portion (6) according to the item (A) to be taken/stored.

4. An automated warehouse (1) according to claim 1, wherein said laser targeting system (8) is configured to generate a linear beam (10) having a pre-defined conformation and/or length and/or position with respect to said point-like beam (9).

5. An automated warehouse (1) according to claim 4, wherein said laser targeting system (8) is configured to generate a linear beam (10) passing through said point-like beam (9).

6. An automated warehouse (1) according to claim 5, wherein said laser targeting system (8) is configured to generate a point-like beam (9) arranged in the middle of said linear beam (10).

7. An automated warehouse (1) according to claim 1, wherein said laser targeting system (8) is configured to generate a linear beam (10) having a shorter length (L) than a dimension of the plan area of a drawer (2).

8. An automated warehouse (1) according to claim 7, wherein said laser targeting system (8) comprises:
   first motor means (12) for shifting said point-like beam (9) and/or said linear beam (10) in a direction (K-K) orthogonal to the linear beam;
   second motor means (13) for shifting said point-like beam (9) and/or said linear beam (10) in a direction (H-H) parallel to the linear beam (10).

9. An automated warehouse (1) according to claim 1, wherein said laser targeting system (8) is configured to generate a linear beam (10) having a longer length (L) than a dimension of the plan area of a drawer (2).

10. An automated warehouse (1) according to claim 9, wherein said laser targeting system (8) comprises:
    first motor means (12) for shifting said point-like beam (9) and/or said linear beam (10) in a direction (K-K) orthogonal to the linear beam (10);
    second motor means (13) for shifting said point-like beam (9) along a direction (H-H) parallel to said linear beam (10).

11. A method of managing an automated warehouse (1) according to claim 1, comprising:
    setting in said control unit the information related to at least one item (A) to be taken/stored;
    moving the drawer (2) associated with said information from the rest position to the access position;
    generating/positioning at least one point-like beam (9) and at least one linear beam (10) defining a localisation track (11) to identify an item (A) or a housing zone (3) in the drawer (2) arranged in the access portion (6);
    taking/storing said item (A) at the localisation track (11).

12. A method according to claim 11 comprising controlling said laser targeting system (8) so as to modify the conformation and/or length and/or position of said linear beam (10) with respect to said point-like beam (9) according to the item (A) to be taken/stored.

13. A method according to claim 11 comprising controlling said laser targeting system (8) so as to modify the orientation of said linear beam (10) with respect to the drawer (2) arranged in the access portion (6) according to the item (A) to be taken/stored.

* * * * *